Aug. 22, 1933.   H. BOZARTH   1,923,611
TURNING MACHINE
Filed July 14, 1928   2 Sheets-Sheet 2
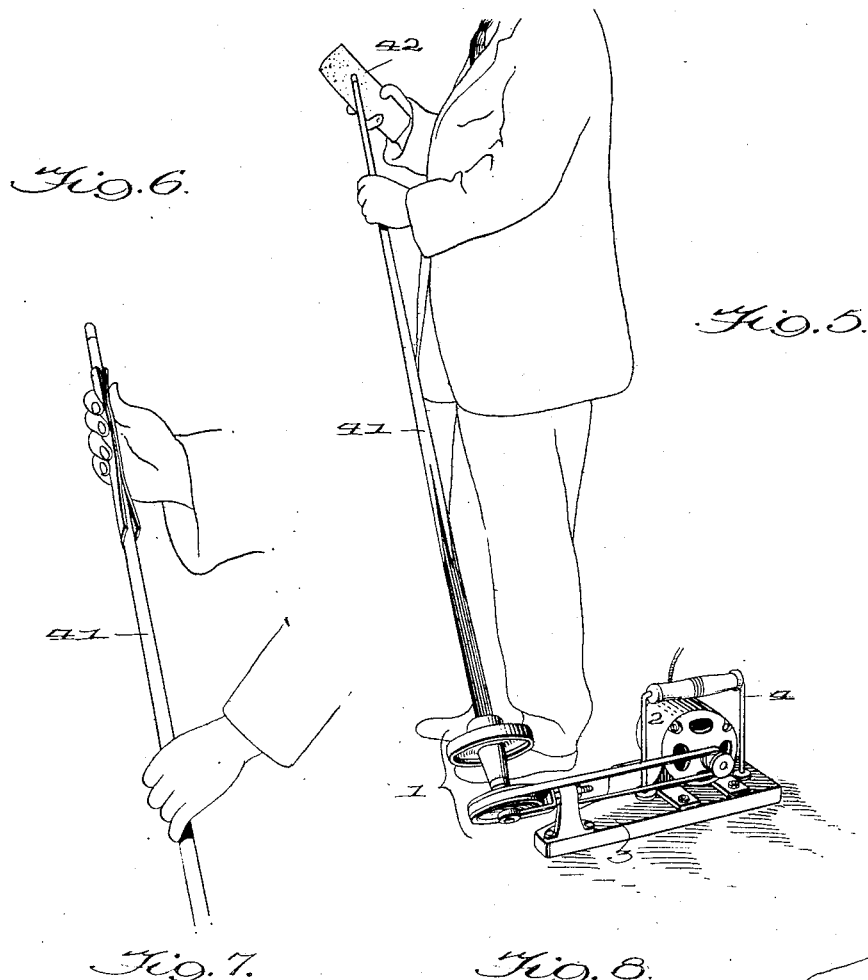
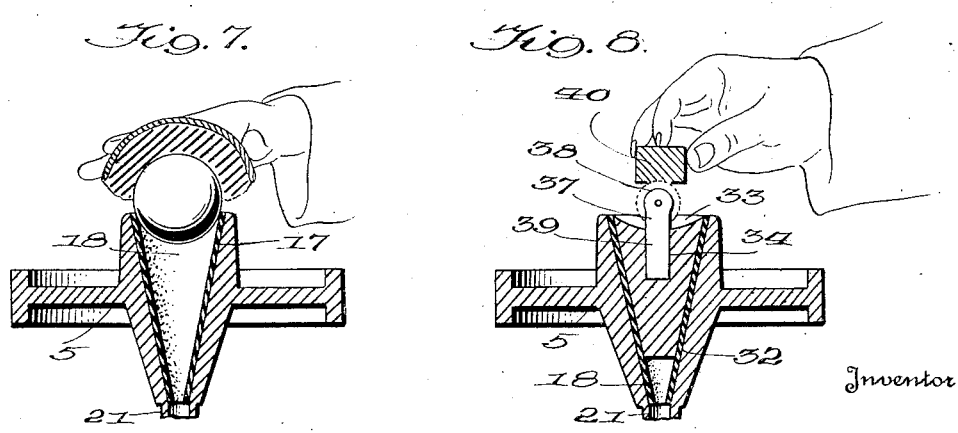
Inventor
HARRY BOZARTH,
By Emery, Booth, Janney & Varney
Attorney Patented Aug. 22, 1933 1,923,611

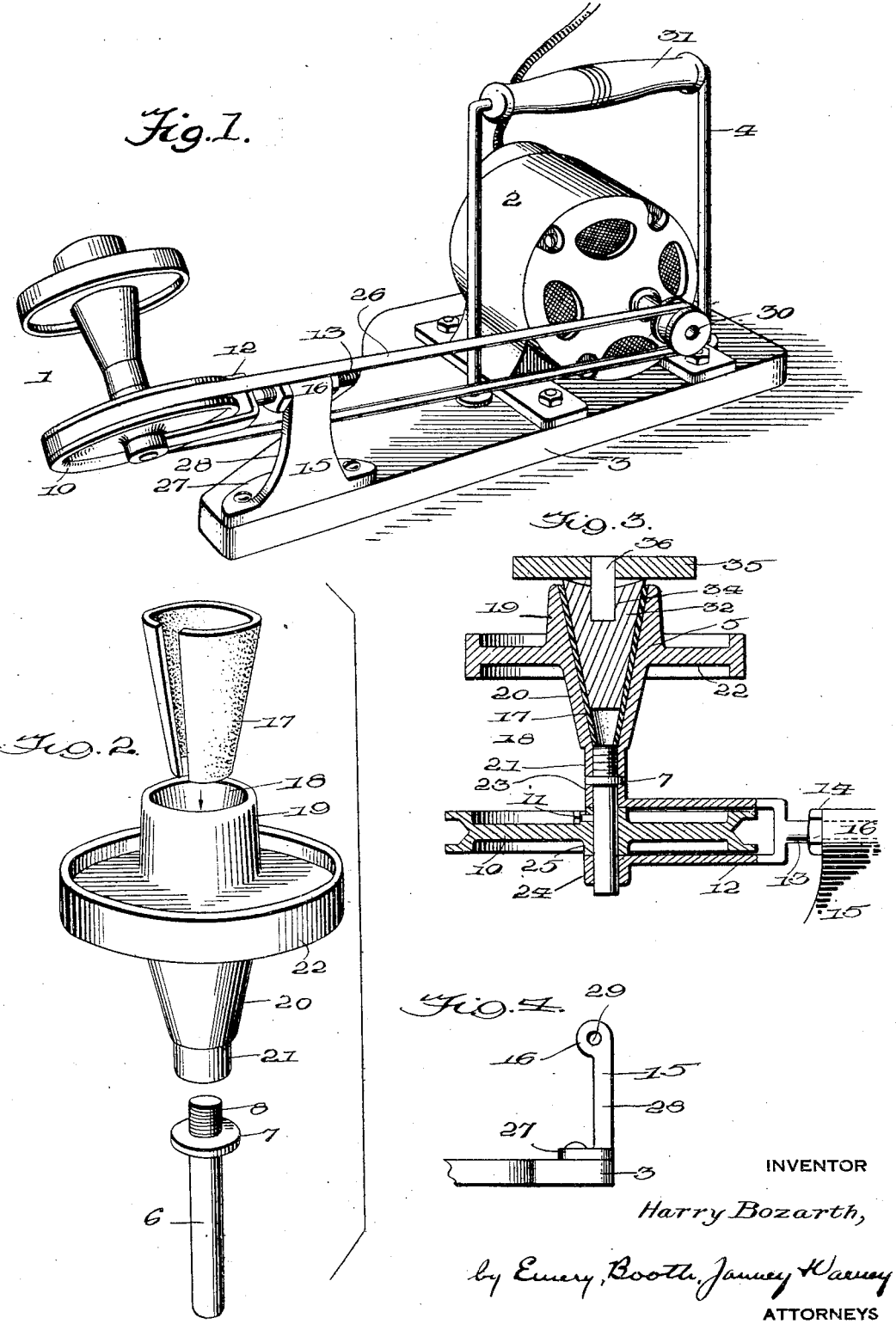

UNITED STATES PATENT OFFICE 1,923,611

TURNING MACHINE

Harry Bozarth, Muskogee, Okla

Application July 14, 1928. Serial No. 292,711

5 Claims. (Cl. 51—237)

My invention relates to portable grinding, polishing and turning machines of the universal purpose type, hereinafter referred to as a turning machine, and aims to provide a compact power driven machine capable of a wide range of adjustments and uses, of convenient size and extreme simplicity, such that it can be economically owned and used by billiard rooms of moderate size, and other small establishments in lines of work for which the machine is adaptable. Although herein shown and described as a cue lathe, with particular relation to use for the maintenance of billiard game apparatus, it is to be understood that such showing and description is merely illustrative of the invention and not restrictive of its scope.

A preferred form of my invention is described in the following specification and illustrated in the accompanying drawings, wherein like figures of reference relate to the same parts throughout, and wherein Fig. 1 is a side view in perspective of the assembled machine;

Fig. 2 is a perspective view of the chuck and associated elements, disassembled;

Fig. 3 is a cross-section of the chuck and pulley assembly and of a portion of the mounting for the same, together with a tool holder and a removable abrasive tool, certain parts being shown in elevation;

Fig. 4 is an end elevation of the chuck-supporting standard;

Fig. 5 is a perspective view of the machine showing the method of using it to operate on long narrow work;

Fig. 6 is a partial view similar to Fig. 5, illustrating another operation;

Fig. 7 is a partial cross-section of the chuck illustrating its use for ball polishing; and Fig. 8 is a partial cross-section of the chuck illustrating the removable tool holder and a chalk reaming tool.

Referring particularly to Figs. 1 to 4, which show a convenient form of my invention for polishing, grinding and turning small objects such as billiard cues and balls, it may comprise a chuck assembly 1 and a source of power, such as an electric motor 2, mounted on a base 3, provided with a carrying handle, such as 4, of convenient form. The chuck assembly 1 comprises the chuck proper, 5; a supporting spindle 6 having a flange 7 and screw thread 8 at the upper end to screw into the bottom of the chuck proper and transmit rotation thereto; a pulley 10 appropriately secured on said spindle, as by a set screw 11; a fork 12 supporting said spindle and provided with a threaded tang 13 carrying two clamping nuts 14; and a standard 15 secured to said base and having an offset top enlargement 16 horizontally apertured to receive said tang. For certain classes of work, such as sanding and polishing billiard cues, I have found it desirable to use a liner 17 in the chuck socket 18. This liner may be cut in the form shown in Fig. 2 to fit the socket smoothly. Any suitable frictional material may be employed, such as rubber, leather, sandpaper, abrasive cloth or the like, and may be cemented in place if necessary.

The chuck proper, 5, best seen in Figs. 2 and 3, may satisfactorily be made of a single casting of aluminum, machined inside and out, although I do not limit myself to such details of construction. This chuck comprises an elongated hollow body externally cylindrical in its upper and shorter portion 19, tapered towards the bottom in its lower and longer portion 20, and terminated by a short internally threaded shank 21 at the bottom, screwed onto the upper end 8 of the spindle 6, and bearing against the spindle flange 7. A peripherally flanged disk 22, perpendicular to the axis of rotation, which joins the body between the two portions, acts as a flywheel and produces a balancing or gyroscopic effect inducing steady running even when turning long slender articles not rigidly supported at the end remote from the chuck, as illustrated by Fig. 5. The chuck socket 18, concentric with the axis of rotation, is flared from bottom to top, thereby binding and automatically centering work without the use of jaws or other mechanism. It is contemplated that the work on which the chuck is to be used will be upright or upwardly inclined, with practically all of its weight supported by the socket.

The arms of the fork 12 end in transverse bearings 23, 24, provided with suitable lubricating means, not shown. The spindle flange 7 bears against the upper face of the upper bearing 23, thus transmitting the thrust of the chuck to the fork. The lower bearing 24 may be either open or cupped. The pulley 10 has a central hub 25, finished to a running fit between the inner faces of the bearings 23, 24, and is flanged to take a driving belt 26, herein shown as a standard V-type rubber and fabric belt. The standard 15, herein shown with a broad footing 27 on the base 3, conveniently comprises a vertical web 28 and the top enlargement 16 offset towards one side, as shown in Fig. 4, to increase the belt clearance when the chuck is inclined.

The tang or shank 13 of the fork passes through a non-threaded longitudinal hole 29 in the enlargement, and is adjustable therein both angularly, to position the chuck for inclined work, and longitudinally, to tighten the belt, being moved and clamped by the nuts 14.

The driving power herein illustrated consists of the electric motor 2 which may conveniently be mounted with its shaft horizontal and transverse to the base 3. The motor shaft carries a suitable pulley 30 somewhat wider than the belt 26, so as to avoid undue wear and friction from the twist of the belt. For the sort of work herein described a standard type motor of about one-quarter horsepower, with pulleys giving a chuck speed of between 400 and 450 R. P. M., has proved satisfactory. Of course, other power, such as a small internal combustion engine, might be used with equally good results in situations where electric current is not obtainable, and the speed will be governed by the character of the work. The lifting handle 4 is here shown as made of an inverted U-shaped rod with a wooden grip 31.

A variety of attachments may be employed with my machine. A tapered tool holder 32, adapted to fit inside the lined chuck socket 18, is hollowed at the top, as at 33, and provided with a central axial recess 34, herein shown as square in cross section, to receive the shanks of various attachments, or to receive work of square cross section, such, for example, as billiard cues with square butts. The recess 34 and the shanks of the attachments need not necessarily be square but can be of any shape which will hold the attachment or the work firmly in the tool holder 32. Two attachments are shown in Figs. 3 and 8, being respectively a flat circular abrasive stone 35 with a central square shank 36, and a chalk reamer 37. This chalk reamer comprises a circular blade 38, toothed on the periphery, and pivotally supported within the forked upper end of a square-sectioned shank 38.

The purpose of the circular blade is to ream out a concavity in a piece of billiard chalk such as 40, and the pivotal mounting is to enable a fresh sharp section of the blade to be presented as needed.

In using my invention to dress cues the chuck assembly 1 is inclined so as to bring the part of the cue 41 being worked upon into a convenient position according to the height of the operator, as is apparent from Figs. 5 and 6, the former representing dressing a cue tip with a piece of sandpaper 42, and the latter showing smoothing a cue shaft. In these operations the value of the self-centering and automatic gripping features of my invention are apparent. All the operator has to do is to slip the cue butt into the chuck socket when he begins work and pull it out when he finishes.

Fig. 7 illustrates a polishing operation, in this instance on a billiard ball. The ball is simply put into the mouth of the chuck, where it is held by the friction of the liner 17, and rotated while a polisher, such as a wool pad 43, is applied.

Inasmuch as the axial inclination of the chuck may be varied by turning the fork within such limits as are imposed by the driving belt, and the entire apparatus may be moved as a unit either horizontally or vertically, it follows that the chuck is capable of a wide range of adjustment to suit the height of the operator and the nature of the work. Of course for such purposes as are illustrated by Figs. 7 and 8 the entire machine will be set on a table or work bench.

From the foregoing it will be seen that I have invented a machine adapted to a variety of uses, readily and economically constructed and kept in repair, not likely to get out of order, and sufficiently sturdy to be relied upon to handle rapidly and accurately those classes of work for which its size adapts it.

Having described a specific form of my invention it is to be understood that I do not restrict myself thereto, but that the scope of my invention is to be ascertained from the appended claims.

What I claim is:

1. A portable universal purpose turning machine comprising, in combination, a base 3, adapted to be carried by a handle 4 and having mounted thereon power driving means 2 and a standard 15, a fork 12 horizontally supported by said standard and adapted to be adjustably positioned therein by means of a threaded tang 13 and nuts 14, a spindle 6 carried transversely by said fork, a pulley 10 fixed to said spindle between the arms of said fork, and a chuck 5 fixed to one end of said spindle externally of said fork, said chuck comprising an axial body, a circumferential steadying disk 22 and a flaring work-receiving socket 18 open at the end opposite said spindle 6.

2. As an attachment for a universal purpose turning apparatus including a chuck, the sub-combination for billiard chalk reaming comprising a circular knife, teeth on the periphery of said knife, a bifurcated shank and a pivotal mounting perpendicular to said shank engaging said knife therewith, said shank being adapted to be secured axially in said chuck and to be rotated thereby.

3. An attachment for a multi-purpose turning machine including a chuck, which comprises a billiard-chalk reamer having a shank and a cutting edge extending above said shank symmetrical with the axis of said shank, and a member having a socket to receive said shank and rotate said reamer and adapted to be secured axially in said chuck and to be rotated thereby.

4. In a turning machine, in combination, a chuck wherein work is adapted to be held by gravity, a motor, a belt connection between said motor and said chuck, a support for said chuck comprising a vertical standard, a bracket whereupon said chuck is adapted to be rotated, said bracket being adjustable both longitudinally and rotationally in said standard for adjusting the tension of said belt and adjusting the axial inclination of said chuck.

5. An attachment for a multi-purpose turning machine including a chuck, which comprises a reaming tool having a mounting portion and a working portion extending above said mounting portion symmetrically with the axis of said mounting portion, and a member having a socket to receive said mounting portion and rotate said reamer and adapted to be secured axially in said chuck and to be rotated thereby.

HARRY BOZARTH.